United States Patent

Peters et al.

[15] 3,661,722
[45] May 9, 1972

[54] APPARATUS FOR CARBONIZING CARBONACEOUS MATERIALS WITH DIRECT CONTACT HEAT EXCHANGE MATERIAL

[72] Inventors: Werner Peters, Wattenscheid; Horst Luther, Clausthal-Zellerfeld; Josef Langhoff, Dinslaken; Otto Abel, Clausthal-Zellerfeld; Gerhard Schmeling, Koeln-Delbrueck, all of Germany

[73] Assignee: Bergwerksverband GmbH, Essen, Germany

[22] Filed: Oct. 20, 1969

[21] Appl. No.: 867,563

Related U.S. Application Data

[62] Division of Ser. No. 757,213, Aug. 26, 1968.

[30] Foreign Application Priority Data

Aug. 25, 1967    Germany..............................B 94152

[52] U.S. Cl..................202/99, 202/108, 202/113, 202/121, 201/12, 201/20, 201/34
[51] Int. Cl.........................................C10b 1/04, C10b 3/00
[58] Field of Search ...............201/12, 20, 32, 34; 202/113, 202/117, 120, 121, 221, 99, 108, 124

[56] References Cited

UNITED STATES PATENTS

| | | | |
|---|---|---|---|
| 3,018,226 | 1/1962 | Batchelor et al.....................201/12 X |
| 3,475,278 | 10/1969 | Peters et al. .........................201/12 X |
| 2,688,853 | 9/1954 | Hachmuth et al. ........................62/14 |

*Primary Examiner*—Norman Yudkoff
*Assistant Examiner*—David Edwards
*Attorney*—Michael S. Striker

[57] ABSTRACT

An apparatus for continuously producing shaped coke bodies from a carbonaceous material, comprising means for continuously introducing carbonaceous material together with a fine-size hot heat-exchange material into a first reactor, subjecting the mass thus formed to a coking operation in the first reactor to form a low-temperature coke, then withdrawing the mass, and thereafter passing the pre-coked material together with fine-size hot heat-exchange material into a second reactor and subjecting the mass therein to another coking operation at substantially higher temperatures than used in the first coking operation.

3 Claims, 3 Drawing Figures 3,661,722

APPARATUS FOR CARBONIZING CARBONACEOUS MATERIALS WITH DIRECT CONTACT HEAT EXCHANGE MATERIAL

CROSS-REFERENCE TO RELATED APPLICATION

The present application is a division of application Ser. No. 757,213, filed Aug. 26, 1968.

Application Ser. No. 610,451 of the inventors Gerhard Schmeling and Werner Peters of the present case together with an inventor Kurt Kleisa, relating to a "Continuous Coking Apparatus," has been filed on Jan. 19, 1967, now U.S. Pat. No. 3,444,048.

BACKGROUND OF THE INVENTION

In the just stated related application, an apparatus has been described for the continuous manufacture of shaped coke bodies, wherein the shaped carbonaceous bodies and a hot heat-exchange material are introduced into the top of a reactor and after passing the mass through the reactor from top to bottom and subjecting it to a coking operation, the hot shaped coke bodies are removed at the bottom of the reactor and separated from the heat-exchange material and are subjected to cooling while the heat-exchange material is pneumatically recirculated into the reactor after reheating. It has been found that very high temperatures are necessary in the described apparatus, requiring heat-exchange materials of extremely high stability.

It was furthermore found that it would be highly desirable to obtain a desulfurization of the carbon bodies in order to arrive at shaped coke bodies of low sulfur content. However, this normally would have required a separate operational step.

SUMMARY OF THE INVENTION

It is therefore an object of the invention to improve the temperature conditions of the described apparatus.

A further object is to provide an apparatus which can broadly be used for purposes other than the coking of shaped bodies, particularly in the thermal treatment of certain ores.

With the above objects in view, the invention comprises an apparatus for the thermal treatment of materials wherein a plurality of reactors is provided and means exist for each reactor outlet to separate a heat-exchange material from a material to be processed, and wherein a connecting passage is provided between the reactors for receiving the material to be processed and for passing it from the first to the second reactor, and wherein means are provided for recirculating the heat-exchange material, after reheating, into at least one of the two reactors.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
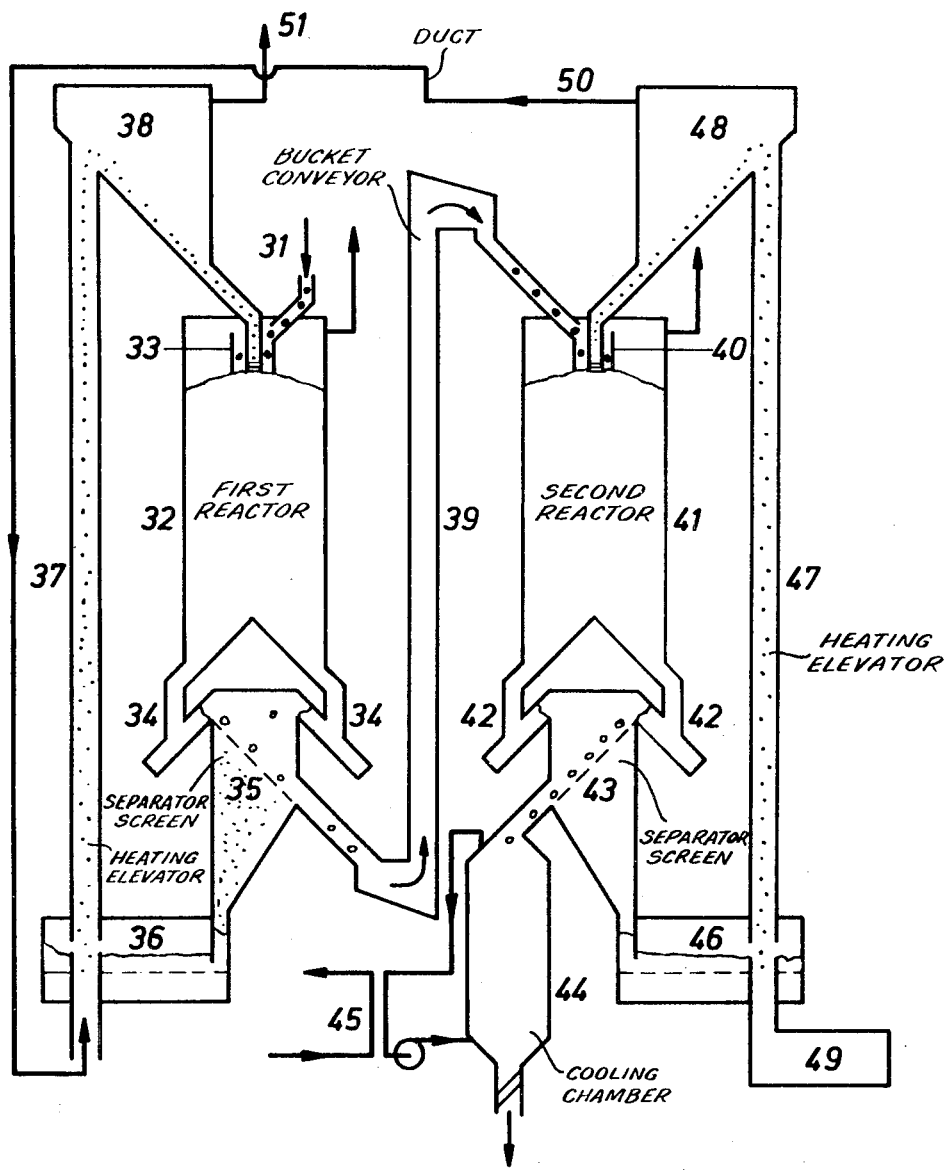
FIG. 1 illustrates in diagrammatic cross-section an apparatus for practicing the invention, wherein the two reactors are arranged side by side.

The invention, as stated, contemplates the thermal treatment of a material, for instance a coking treatment of shaped carbonaceous bodies at a plurality of temperature stages. The temperature in the first stage may, for instance, be between 550° and 750° C., while the temperature in the second stage may be substantially higher. For instance, the temperature in the second stage may be 800° C. and higher.

With reference to the drawings, it will be seen that shaped bodies of a carbonaceous material, for instance coal, are introduced at 31 into a first reactor 32. They are here mixed with a heat-exchange material, for instance hot sand, in a mixing and dispensing device 33, the source from which the hot sand is delivered to the reactor to be discussed further below.

The sand may, for instance, have a temperature of about 600° C. The sand-low-temperature-coke mixture is withdrawn from the reactor at its bottom and by means of two dosing devices 34 is passed to a separator screen 35. The sand separated from the coke is then passed to a fluidizing bed 36, from which it is lifted in the heating elevator 37 to a sand collector chamber 38 where it is separated from the hot gases employed in the heating and lifting operation. The sand then re-enters the reactor 32.

The pre-coked material, that is the low-temperature coke, which may have a temperature, for instance, of 500° C., is hauled by means of a bucket conveyor 39 into a second reactor 32, where it first passes again through a mixing and dispensing device 40 where it is mixed with a heat-exchange material such as hot sand, which in this case may have a temperature of, for instance, 1,050° C. After carrying out the second coking operation in the reactor 41, the mixture of shaped coke bodies and sand is withdrawn from the reactor through two dosing devices 42, similar to the arrangement shown in connection with the first reactor and is likewise passed to a separator screen 43. The shaped coke bodies, which now have a temperature of about 950° C., after separation from the sand are passed to a cooling chamber 44 where their cooling may be effected by a circulating gas countercurrent. The sensible heat of the circulating gases can also be employed in an exchanger 42 to effect a preheating of the air, or for steam generation purposes.

The sand extracted in the separator 43 from the coking mass is again passed through a fluidizing bed 46, similar to the arrangement with the first reactor, and is here taken up by a stream of hot gas lifting it by heating elevator 47 for recirculation into the second reactor 41 after elimination of the flue gases in the sand collector 48.

The hot gases necessary for generation of the required heat are, for instance, formed in a burner 49 using a suitable fuel, such as oil and air. The flue gases of the heating elevator 47, which may, for instance, have a temperature of 1,050° C., may be recirculated through a duct 50 to effect the heating in the heating elevator 37 of the first reactor.

While this embodiment shows the two reactors arranged side by side, they may also be superimposed upon each other. An obvious arrangement would be a design wherein the first reactor is placed above the second reactor and the pre-coked material of the first reactor may simply be moved by gravity, for instance on a chute, into the second reactor.

Figure 2:
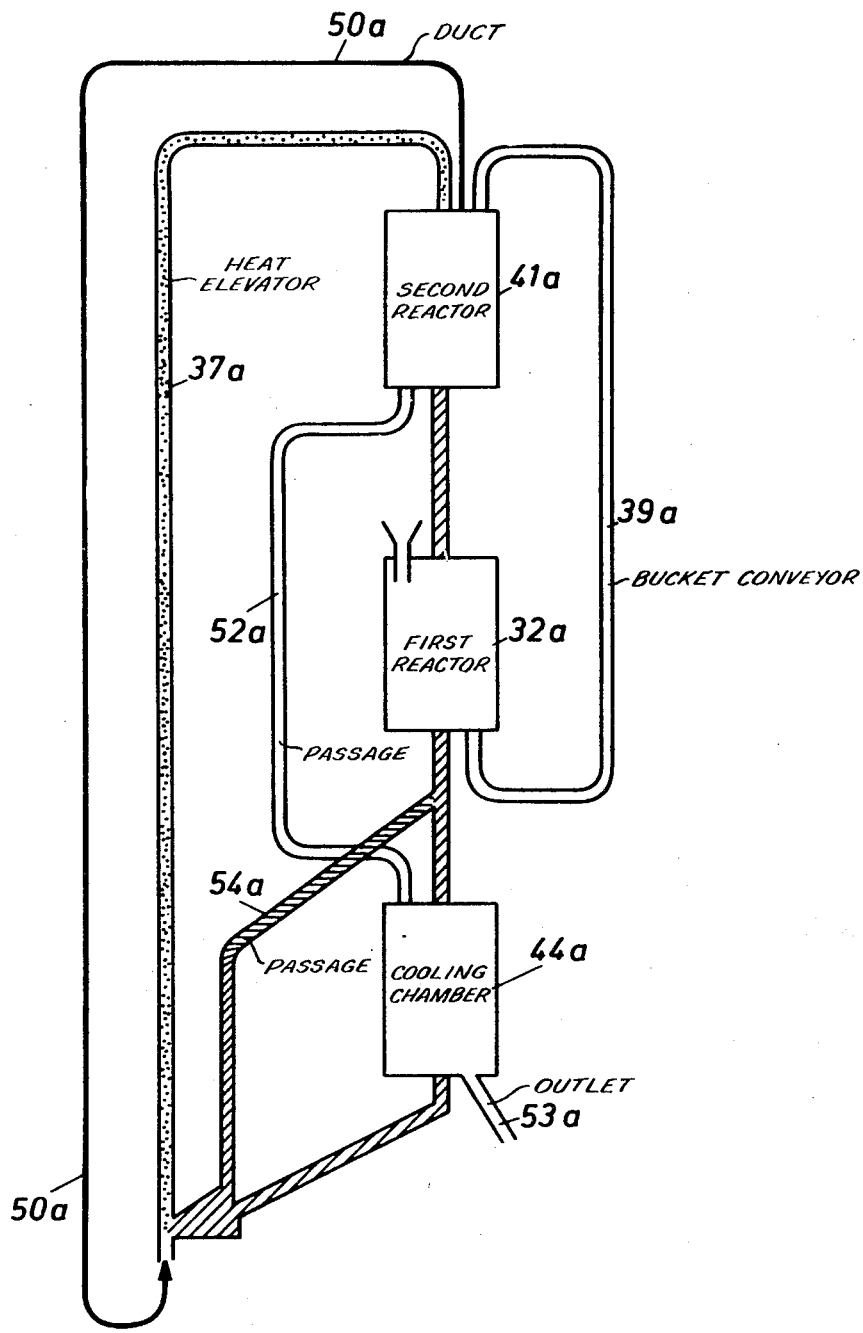
FIG. 2 illustrates another embodiment of an apparatus for practicing the invention, wherein the second reactor is arranged on top of the first reactor and which includes a cooling chamber wherein the heat-exchange material that has spent part of its heat is used for cooling purposes.

For reasons of heat economy during the thermal treatment of the shaped bodies, it is, however, preferable to reverse the arrangement and to place the second reactor at a higher level than the first reactor, for instance, to dispose the second reactor on top of the first reactor. An embodiment incorporating this concept is shown in FIG. 2.

As will be seen, there are two reactors in this embodiment, the first reactor designated 32a being on a level below the second reactor 41a. There also is a cooling chamber 44a. In the operation of the device, the shaped carbonaceous bodies are introduced by the inlet indicated in the drawing into the first reactor 32a, while the hot sand is obtained by withdrawal from the superposed second reactor 41a. There may again be mixing and dispensing devices which, to simplify the illustration, are not shown in the drawing.

The first coking operation then takes place at a temperature between 500° and 700° C., whereupon the obtained low-temperature coke is withdrawn and lifted by a bucket conveyor 39a into the second reactor 41a. The coke is here mixed again in the described manner with high-temperature sand at a temperature between 700° and 900° C. The sand is obtained from the heat elevator 37a in the manner further to be described. The coked shapes are then passed through a passage 52a into the heat-exchanger or cooling chamber 44a, where they may be cooled with the sand separated from the coke at the bottom of the first reactor 32a. The cooling may also be effected by means of circulating gases. The finished coke is then removed, after separation from the sand, through an outlet 53a.

The sand separated out at the bottom of the reactor 32a is either passed through a passage 54a directly into heat elevator 37a or into the cooling chamber 44a and only after the use therein then flows likewise into the elevator lift 37a. Thus, the direction of the sand may be adjusted at will, or a portion of the sand may be allocated to each of the passages, one leading directly to the heat elevator and the other leading thereto via the cooling chamber 44a.

The flue gases arising from the operation in the second reactor 41a are recirculated through a duct 50a into the heat elevator in a manner that they enter the heat elevator at the place where also the two ducts for recirculating of the sand merge.

Figure 3:
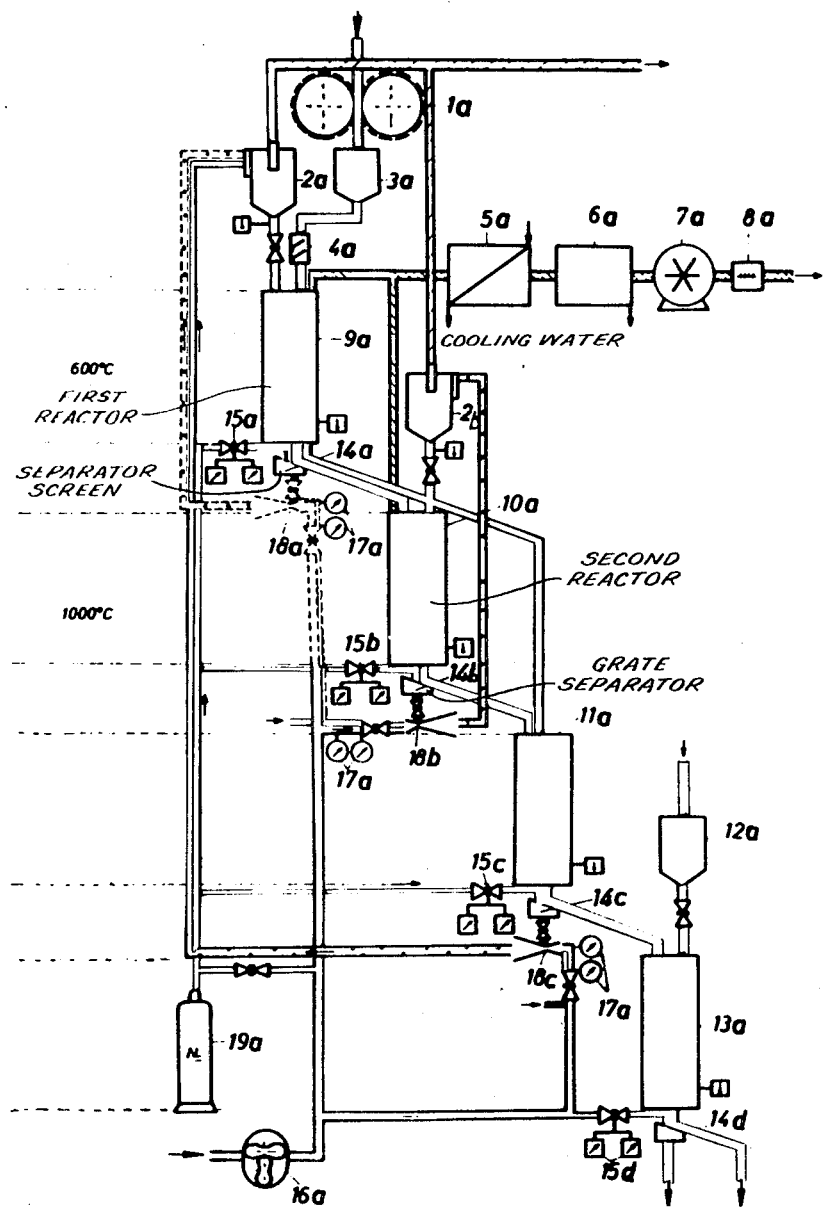
FIG. 3 includes another embodiment of the invention wherein the second reactor is arranged below the first reactor and which includes two cooling chambers arranged in series.

FIG. 3 illustrates another embodiment of the apparatus of the invention. As shown, a mixture of coal and coke is passed into the bight between two rollers 1a, where it is pressed into different shapes, such as nut-, pillow- or egg-briquettes, which are then introduced through the bin 3a and a subsequent two-leaf gate wherefrom they enter the first reactor 9a. This reactor may be operated at a temperature of about 600° C. Heat-exchange material in the form of sand heated to a temperature of about 600° C is passed into this reactor or a cyclone 2a and mixed in the usual manner. The coke oven gas released during the heating of the form bodies in the first reactor is removed through the head of the reactor and passes in sequence a cooling device 5a, a tar separator 6a, a blower 7a and a gas meter 8a. The coked shaped bodies obtained in this first stage are removed at the bottom of the reactor through a dosing device and are separated on a separator screen 14a from the sand. The dosing device is actuated by an impulse transmitter 15a.

The formed coke bodies now pass into the second coking reactor 10a and are degassed in this second stage at about 900° to 1,000° C. The gases released in this step escape through the top of the second reactor into the line of apparatus described above starting with the cooling device 5a. The coking reactor 10a is continuously supplied with high heat sand from the superimposed cyclone 2b. The sand is separated from the coke bodies in the same manner as in the case of the first reactor at the bottom of reactor 10a by means of a grate separator 14b. The sand thus separated is recycled by means of high heat flue gases into the cyclone 2b, as indicated in the drawing.

The mechanism used in recycling and reheating the sand will be further described below.

The coked bodies now pass into a first heat-exchanger or cooling chamber 11a, where they are united with hot sand from the first reactor 9a. Since they are at a substantially higher temperature, they will transmit a large part of their heat to the sand. The thus reheated sand is then blown back into the cyclone 2a of the first reactor after further reheating. From the first heat-exchanger or cooling chamber the coked bodies pass through a separator 14c into a second heat-exchanger or cooling chamber 13a where they are subjected to further cooling by means of coke fines obtained from a coke bunker 12a. Following this stage, the shaped coke bodies and the coke fines are again separated in a separator 14d. The coke fines may be passed to a briquetting press.

For conveying or reheating of the sand in the circuits air is used, which is introduced from a blower 16a, and a heating gas is introduced through injector nozzles 18a, 18b and 18c. The injector nozzles are actuated by impulse transmitters 15a, 15b, 15c and 15d, which are controlled by inert gas derived, for instance, from nitrogen container 19a. The separation of form bodies and heat-exchangers is effected in all cases by grate separators, indicated as 14a, 14b, 14c and 14d. The amounts of air and of the heating gas employed may be controlled and measured by control and measuring devices 17a, 17b and 17c.

It is a matter of choice whether in this operation the second heat-exchange or cooling stage may be operated also with sand instead of coke fines, or, if desired, with circulating gases.

The apparatus is particularly suited for the production of shaped coke bodies of low sulfur content, in that special provision may be made for the simultaneous desulfurization of the shaped bodies during the thermal treatment.

The desulfurization of the shaped coal or similar bodies may be effected by using a heat-exchanger which consists of or includes solids suited to absorb the sulfur-containing compounds which form during the coking operation, in particular the hydrogen sulfide. Suited as sulfur acceptors are particularly $MnO_2$, $ZnO$, and $CaO$. The sulfur compounds are then automatically removed from the heat-exchange materials during the reheating process, which therefore results in a regeneration of the heat-exchangers.

It is, however, also possible to effect the desulfurization of the coal bodies by introduction of reducing agents into the mass in the reactor. Preferred as reducing agents are hydrogen or hydrogen-containing gases and/or ammonia or ammonia-containing gases, which may, for instance, be introduced into the reactor mass by means of injection nozzles or lances. Both means for the desulfurization of the form bodies can be used concurrently or each may be used alone, or they may be used successively. In the case of in-series connected reactors, it may be sufficient to provide for desulfurization either in the first or in the second reactor.

If a circulating gas is employed in the cooling stage, it is preferable to desulfurize the circulating gas in order to prevent the gas from undoing the effects of the preceding desulfurization of the form bodies. Thus, the obtained desulfurized coke bodies should be cooled with circulating gases that are free of sulfur.

The apparatus of the invention can be used for many different purposes. It is in particular highly useful for the production of iron sponge from lump ore. It is only necessary to feed iron sponge instead of coal bodies into the reactor and at the same time to introduce reducing gases. It is also possible to effect the coking in the reactor of coal shapes in admixture with or lumps or of coal briquettes with ore. If sufficiently high temperatures are used, it will thus be possible to obtain shaped ore coke bodies with a high iron content.

The degassing and desulfurization of lumped coal, coal briquettes or other carbonaceous agglomerates as proposed in the invention can also be effected under elevated pressures. The entire apparatus may then be operated under a pressure-proof bell-shaped tower or the device itself may be made pressure-proof. The raw materials must in both cases be introduced into the reactor through pressure gates and must in the same way be withdrawn therefrom. The operation under pressure has the advantage that in the case of release of large amounts of hydrogen-containing gases, a gas will readily be obtained that is already under elevated pressure.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for the thermal treatment of carbonaceous materials to form coke bodies, comprising a first reactor having a top and a bottom; inlet means at said top for introducing the carbonaceous materials to be processed and a fine-size heat-exchange material in concurrent flow into said first reactor; outlet means at said bottom; separator means at said outlet means of said first reactor; first passage means for recycling the separated heat-exchange material from said outlet means to said inlet means of said first reactor; heating means for reheating said heat-exchange material associated with said first passage means; a discrete second reactor having an upper and a lower end provided with an intake and an exit, respectively; a connecting passage between said outlet means of said first and said intake of said discrete second reactor for passing the separated carbonaceous materials processed in said first reactor to said second reactor; supply means for supplying fine-size heat-exchange material into said intake in concurrent flow with said carbonaceous materials; second separator means at said exit of said second reactor for separating said carbonaceous materials and said heat-exchange material; said second passage means communicating with said exit and said intake for conveying the separated heat-exchange material back into said second reactor, and heating means associated with said second passage means; and discharge means for the processed carbonaceous materials disposed past said second separator means of said discrete second reactor.

2. The apparatus for the thermal treatment of carbonaceous materials of claim 1, wherein said second reactor is disposed on top of said first reactor and said passage means includes a connecting passage for the fine-size heat-exchange material from said second to said first reactor; a cooling chamber and; a passage from said first reactor to said cooling chamber.

3. The apparatus of claim 2, wherein said cooling chamber is arranged following said first reactor and which includes a passage between said first reactor and said cooling chamber for fine-size heat-exchange matter; a passage for processed carbonaceous material extending from the bottom of said second reactor to said cooling chamber; and outlet means for said cooling chamber.

* * * * *